United States Patent
Little (10) Patent No.: US 8,396,961 B2
(45) Date of Patent: Mar. 12, 2013

(54) DYNAMIC CONTROL OF TRANSACTION TIMEOUT PERIODS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 679 days.

(21) Appl. No.: 12/551,446

(22) Filed: Aug. 31, 2009

(65) Prior Publication Data
US 2011/0055376 A1 Mar. 3, 2011

(51) Int. Cl.
*G06F 15/173* (2006.01)
*G06F 15/16* (2006.01)
(52) U.S. Cl. ......... 709/224; 709/201; 709/203; 709/223
(58) Field of Classification Search .......... 709/201–203, 709/223–224
See application file for complete search history.

(56) References Cited

U.S. PATENT DOCUMENTS

| | | | | |
|---|---|---|---|---|
| 5,761,721 A | * | 6/1998 | Baldus et al. | 711/141 |
| 6,301,601 B1 | * | 10/2001 | Helland et al. | 709/223 |
| 7,197,533 B2 | * | 3/2007 | Vincent et al. | 709/203 |
| 8,213,295 B2 | * | 7/2012 | Ginde | 370/216 |
| 2001/0011228 A1 | * | 8/2001 | Shenkman | 705/14 |
| 2008/0034082 A1 | * | 2/2008 | McKinney | 709/224 |
| 2008/0046608 A1 | * | 2/2008 | Lee et al. | 710/30 |
| 2008/0062863 A1 | * | 3/2008 | Ginde | 370/221 |
| 2010/0223217 A1 | * | 9/2010 | Little | 709/224 |

OTHER PUBLICATIONS

"JBoss Transactions 4.2.3, JTS Programmers Guide", © 2006, 117 pages.
Johnson, Rod, et al., "Spring java/j2ee Application Framework, The Spring Framework—Reference Documentation", Version 2.5.6, © 2004-2008, 590 pages.

* cited by examiner

*Primary Examiner* — Bharat N Barot
(74) *Attorney, Agent, or Firm* — Lowenstein Sandler LLP (57) ABSTRACT

A processing device receives a request to initiate a new transaction. The processing device identifies one or more components of that will be used by the new transaction. The components may include hardware components and software components that operate on the hardware components. A timeout period is determined to apply to the new transaction based on properties of the one or more components and a current resource utilization of the one or more components. The new transaction is then initiated, wherein the determined timeout period is assigned to the new transaction.

20 Claims, 6 Drawing Sheets

DYNAMIC CONTROL OF TRANSACTION TIMEOUT PERIODS

TECHNICAL FIELD

Embodiments of the present invention relate to transactional systems, and more specifically to optimizing transactions in transactional systems by dynamically changing transaction timeouts.

BACKGROUND

Some transaction systems use static timeouts for transactions, which may be a default timeout or a specified timeout. Neither type of static timeout can be determined after a request to initiate a transaction is received. Moreover, neither type of timeout can be modified for a transaction after the transaction has begun.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing transactions in a distributed computing system. In one embodiment, a processing device executing a transaction manager receives a request to initiate a new transaction. The processing device identifies one or more components of the distributed computing system that will be used by the new transaction. The components may include hardware components and software components that operate on the hardware components. A timeout period is determined for application to the new transaction based on properties of the one or more components and a current resource utilization of the one or more components. The determined timeout period is assigned to the new transaction, and the new transaction is initiated. While the new transaction is active, conditions of the hardware components and/or software components may change. In one embodiment, the timeout period is dynamically adjusted during the new transaction to account for the change in conditions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "determining", "receiving", "identifying", "initiating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
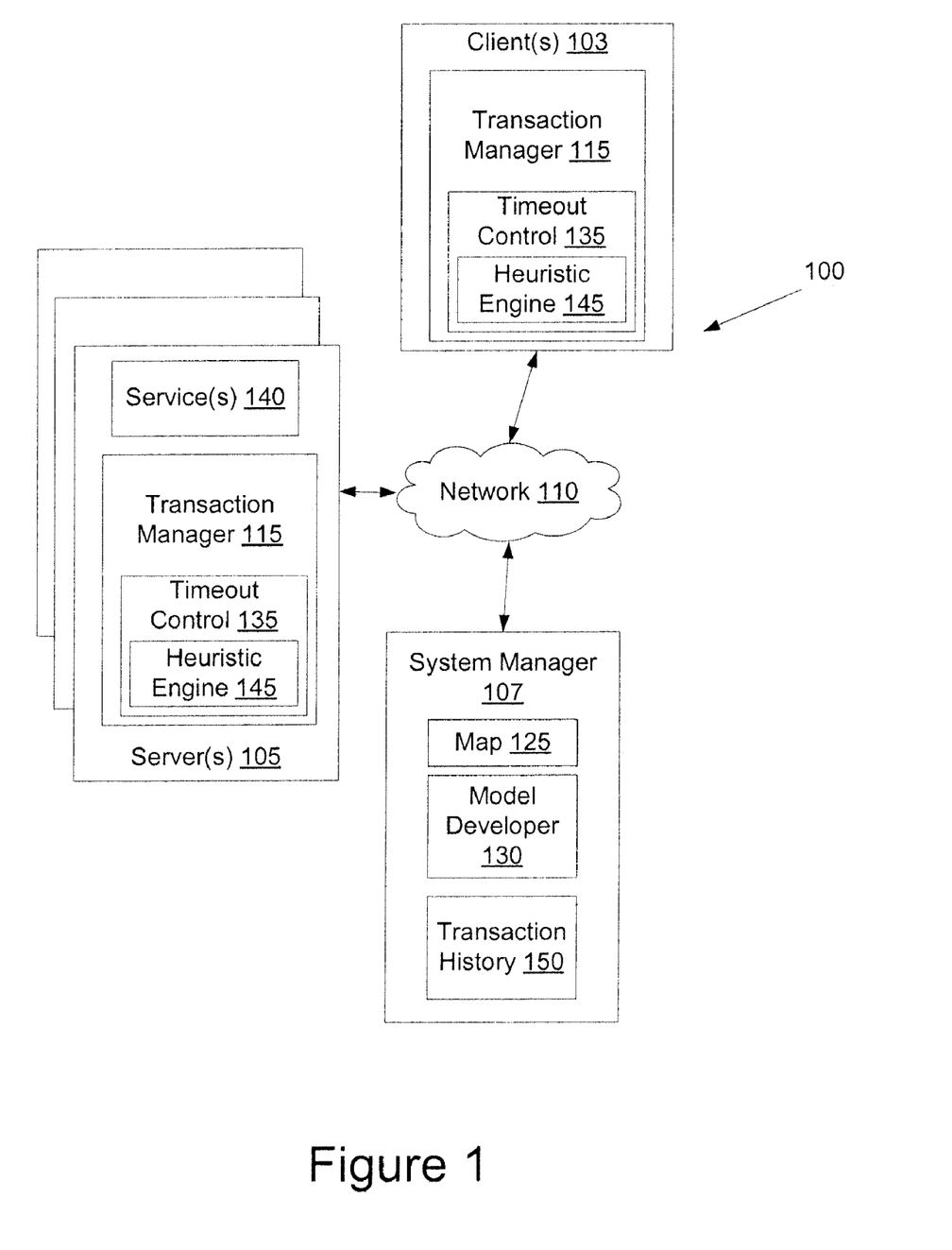
FIG. 1 illustrates an exemplary distributed computing system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients (e.g., client 103) and servers 105, connected via a network 110. The network 110 may be a public network (e.g., Internet), a private network (e.g., Ethernet or a local area Network (LAN)), or a combination thereof. In one embodiment, the network 110 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Client 103 may be, for example, a personal computer (PC), palm-sized computing device, personal digital assistant (PDA), etc. Client 103 may also be an application run on a PC, server, database, etc. In an SOA, client 103 includes an application that accesses services. Client 103 may be a fat client (client that performs local processing and data storage), thin client (client that performs minimal or no local processing and minimal to no data storage), or a hybrid client (client that performs local processing but little to no data storage).

Servers 105 may be personal computers, rackmount servers, or other computing devices. Each server 105 may be a single machine, or may include multiple interconnected machines (e.g., machines configured in a cluster). Each server 105 hosts one or more services 140.

Services 140 may be discretely defined sets of contiguous and autonomous functionality (e.g., business functionality, technical functionality, etc.). Each service may represent a process, activity or other resource that can be accessed and used by other services or clients on network 110. Each service may be independent of other services, and may be accessed without knowledge of its underlying platform implementation.

In an example for a business function of "managing orders," services 140 may include, for example, create order, fulfill order, ship order, invoice order, cancel/update order, etc. Each such service may be autonomous from the other services that are used to manage orders, and may be remote from one another and have different platform implementations. However, the services 140 may be combined and used by one or more applications to manage orders.

In one embodiment, distributed computing system 100 includes a transactional system (e.g., a system capable of performing transactions). A transactional system is a computing system (e.g., a distributed computing system) that includes functionality for performing transactions. A transaction is a set of operations that update shared objects. Transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

In one embodiment, each server 105 hosts a transaction manager 115. One or more clients 103 may also include a transaction manager 115. Each transaction manager 115 is a component of the transactional system. A transaction manager 115 is a software module that coordinates multiple participants during a distributed transaction. A participant may be another transaction manager, a resource manager (a software module that manages a persistent and stable storage system, and/or that manages a service), or a service. Note that a service may include a resource manager. Coordinating a distributed transaction includes determining whether each participant can commit to a transaction, directing each participant to commit if all are able, and directing each participant to rollback if not all participating nodes are able to commit.

In one embodiment, each transaction manager 115 includes a timeout control 135. The timeout control 135 determines a transaction timeout to use for each transaction. Transaction timeout control 135 may include a default timeout to use when no other timeouts apply. Transaction timeout control 135 may also include one or more specified timeouts to apply to particular services 140. Timeout control 135 also includes a heuristic engine 145 that can dynamically determine a timeout time to apply to transactions.

The heuristic engine 145 determines a timeout time to use for a transaction based on multiple different factors. These factors may include, but are not limited to, what services 140 will participate in the transaction, the number of participants of the transaction, whether services 140 hosted by other servers 105 will participate in the transaction, hardware performance of the one or more servers 105 (e.g., processor speed, available memory, etc.) hosting services that will participate in the transaction, a current load on these servers 105, what work will be performed by participating services, a current load on the services 140 that will participate in the transaction, current network traffic, whether databases will be accessed during the transaction, performance of databases that will be accessed, load on such databases, a current length of message queues that will be used, average response time across the network 110 at the time the transaction is initiated, etc.

In one embodiment, one or more transaction managers 115 monitor the components of the distributed computing system 100 to gather information that can be used to determine timeout times. Alternatively, or in addition, a system manager 107 may monitor the components of the distributed computing system 100. System manager 107 may then send system status reports to the one or more transaction managers 115 periodically or upon receiving update requests from the transaction managers 115.

System manager 107 is a service that monitors the distributed computing system 100. System manager 107 runs on a computer such as a server, or personal computer that is connected to the network 110. System manager 107 may be configured to obtain information about hardware components, software components, network traffic, etc. of the distributed computing system 100 from multiple different sources. System manager 107 may also obtain information about transactions that are performed on the distributed computing system 100. For example, system manager 107 may monitor the number of transactions that are active on the system 100 at any given time.

System manager 107 may obtain some information pertaining to performance characteristics and transactions directly from components. In one embodiment, available components are configured to send a status report to the system manager 107. The available components may periodically send status reports to the system manager 107 at a predetermined time interval, or when information included in a last status report has changed. Status reports may identify characteristics and a status of the available component such as name, component type (e.g., machine, service, application server, etc.), current resource utilization (referred to herein as load), or other component properties. Components may also send transaction reports when new transactions are started and when transactions complete. Alternatively, or in addition, system manager 107 may scan the distributed computing system 100 to discover characteristics and or a status of available components and to discover information on transactions using a communication protocol such as, for example, simple network management protocol (SNMP).

In one embodiment, software components are collocated with a process monitor (not shown) that monitors the activities of applications and services with which it is collocated, and reports these activities to the system manager 107. The process monitor 172 can monitor, for example, file system, registry, process and thread information.

To facilitate networking, servers 105 and clients 103 may include components of a middleware service that provides a layer of interconnection between processes, applications, services, etc. over network 110. Examples of middleware services include remote procedure calls (RPC), message oriented middleware (MOM), object request brokers (ORB), enterprise service bus (ESB), etc. The middleware service may also report information to the system manager 107.

In addition to gathering performance characteristics of, and load on, hardware components and software components, system manager 107 may also gather information on additional variables that can affect the performance characteristics. One such variable is service dependency. It can be beneficial to track dependencies between services to gain an understanding of the needs of individual clients and services within the distributed computing system 100. For example, when a particular service begins a transaction, additional services that will participate in the transaction can be predicted based on service dependencies.

In one embodiment, system manager 107 maintains a map 125 of the distributed computing system 100. The map 125 includes components of the distributed computing system 100 (including hardware and software components) and relationships between the components. Such relationships may include physical relationships (e.g., machines that share the same location or power supply), service dependencies and/or other relationships (e.g., logical relationships). The map 125 may also show performance characteristics of the hardware and software components and current load on the software and hardware components. Examples of performance characteristics of hardware components include processor speed, memory capacity, memory speed, etc. Examples of software performance characteristics include operating system version, up time, response time, mean time between failures, and so on. The map may also show current load on components, active transactions that are flowing through the system, etc. In one embodiment, system manager 107 stores the map 125 on a data store (not shown).

In one embodiment, system manager 107 includes a transaction history 150. Transaction history 150 is a record of past transactions. Each entry in the transaction history 150 may represent a particular transaction, and may include information on whether the transaction was successful, how long the transaction took to complete, participants in the transaction, load on participating hardware and software during the transaction, etc.

System manager 107 includes a model developer 130 that may use the transaction history 150 and/or map 125 to develop one or more transaction timeout models. Model developer 130 analyzes the transaction history 150 and/or map 125 to identify transaction completion time patterns. For example, model developer 130 may identify a pattern in which transactions that use three or fewer services that are collocated on a particular server complete within two seconds 99% of the time. Numerous completion time patterns may be identified.

The map 125 and/or the transaction timeout model developed by model developer 130 may be distributed to one or more transaction manager 115 for use by the heuristic engine 145. When a new transaction is to be started, the heuristic engine 145 may compare characteristics of the new transaction to the transaction model. The heuristic engine may then determine an appropriate transaction timeout time for the new transaction, and report this time to the timeout control 135. In one embodiment, the appropriate transaction timeout time is determined based the transaction model, characteristics of the new transaction, and the map 125 (or another indicator of current conditions of the network and the components that participate in the transaction). The timeout control 135 may then assign the determined transaction timeout time to the new transaction. Continuing the previous example, if a new transaction that will include two services that are collocated on the particular machine is to be started, heuristic engine 145 may apply the transaction model to determine that an appropriate timeout time for the new transaction is 2.1 seconds.

Figure 2:
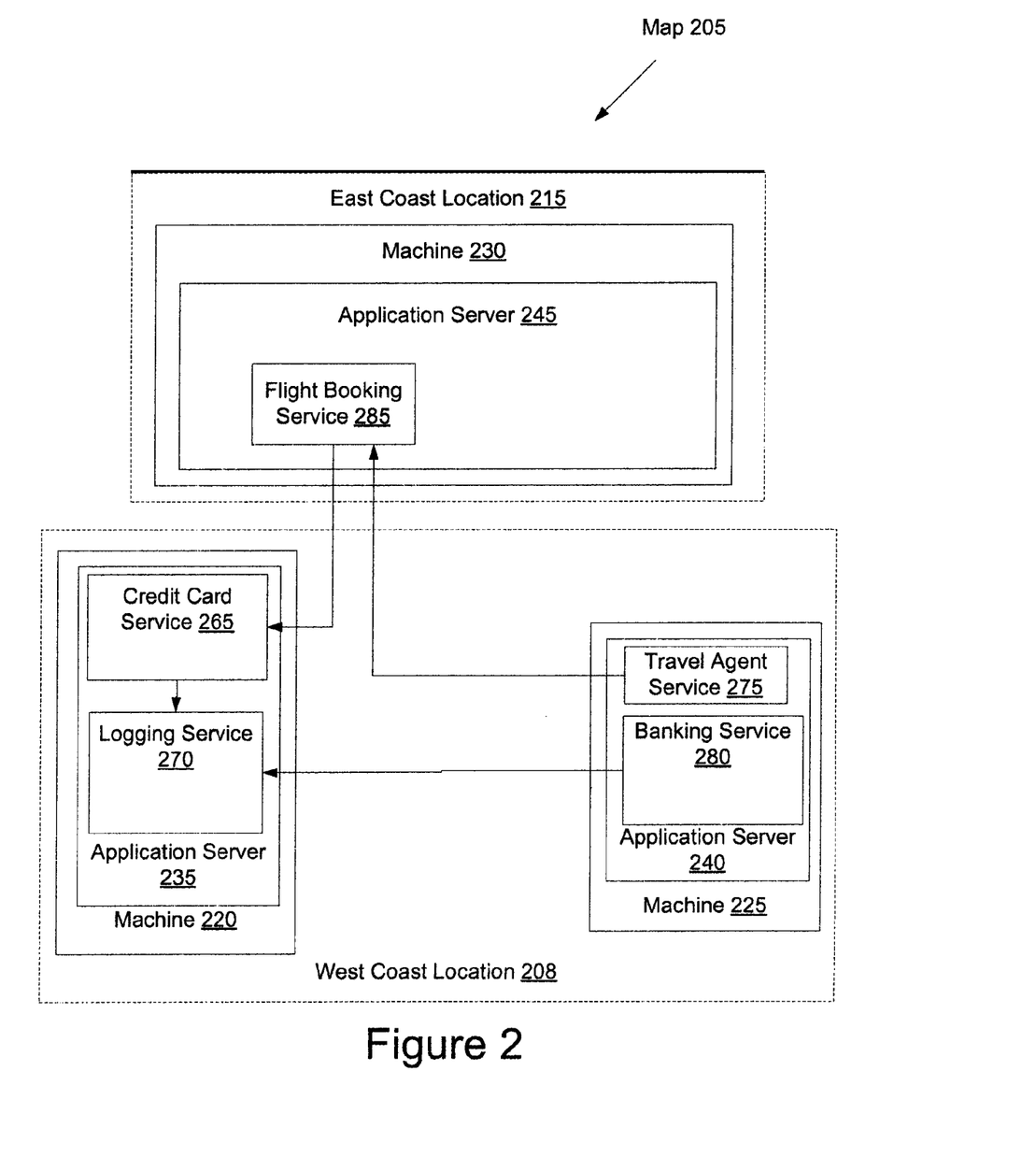
FIG. 2 illustrates a map of an exemplary distributed computing system.

FIG. 2 illustrates a map 205 of an exemplary distributed computing system, in accordance with embodiments of the present invention. The map 205 shows available components of the distributed computing system, including hardware components (e.g., machine 220, machine 225 and machine 230) and software components (e.g., credit card service 265, logging service 270, travel agent service 275, banking service 280, flight booking service 285, application server 235, application server 240 and application server 245). The map 205 also illustrates relationships such as physical relationships and dependencies between available components. For example, the map 205 shows that machine 220 and machine 225 are both located at a West Coast location 208 and that machine 230 is located at an East Coast location 215. The map 205 also shows that application server 235 operates on machine 220, that application server 240 operates on machine 225 and that application server 245 operates on machine 230. Additionally, the map 205 shows that credit card service 265 and logging service 270 operate on application server 235, that travel agent service 275 and banking service 280 operate on application server 240, and that flight booking service 285 operates on application server 245. The map 205 may also show, for example, dependencies of machines to data stores, of machines to power supplies, and so on. In one embodiment, the map 205 shows current transactions that are active on the system and current load on the hardware components and software components.

Information on what services are located on which machines, where the machines are physically located and dependencies between services may all be used to increase an accuracy of a transaction model that is developed by model developer 130. For example, transactions in which all participants are collocated on a single machine will be completed more quickly in general than transactions that include services located on multiple machines. Similarly, the proximity of the machines to one another is also likely to affect transaction completion time. For example, transactions that include services on machine 220 and machine 225 are likely to complete more quickly than transactions that include services on machine 220 and on machine 230 because machine 220 and machine 225 are both located at a west coast location and machine 230 is located at an east coast location.

In one embodiment, map 205 shows dependencies between services. For example, map 205 shows that credit card service 265 depends on logging service 270 using an arrow. Likewise, flight banking service 280 depends on logging service 270, travel agent service 275 depends on flight booking service 285, and flight booking service 285 depends on credit card service 265.

Figure 3:
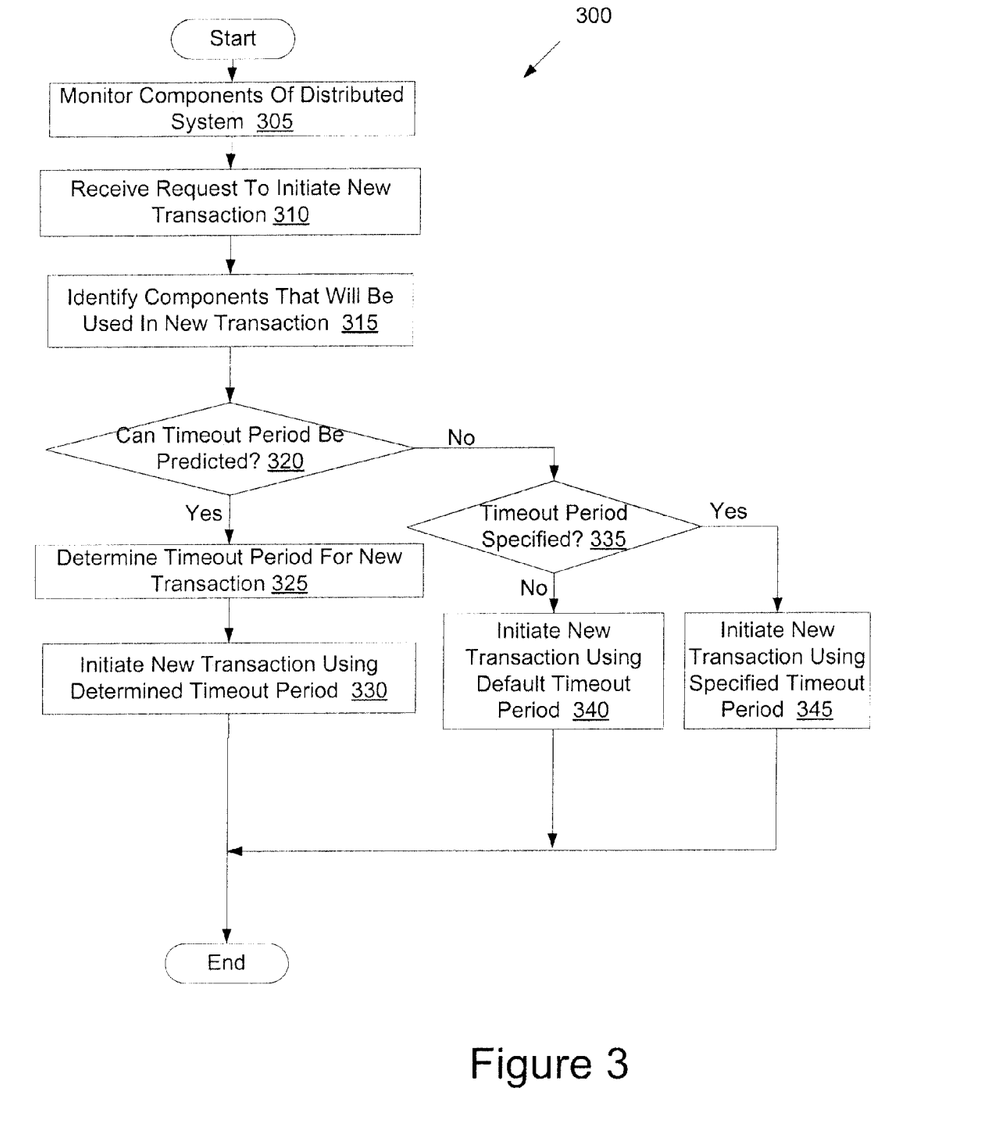
FIG. 3 illustrates a flow diagram of one embodiment for a method of dynamically determining a transaction timeout.

FIG. 3 illustrates a flow diagram of one embodiment for a method 300 of dynamically determining a transaction timeout. The method is performed by processing logic that comprises hardware (e.g., circuitry, dedicated logic, programmable logic, microcode, etc.), software (such as instructions run on a processing device), or a combination thereof. In one embodiment, method 300 is performed by transaction manager 115 and/or system manager 107 of distributed computing system 100 of FIG. 1.

Referring to FIG. 3, at block 305 processing logic monitors components that make up a distributed computing system. The components may include both hardware components and software components. The available components may be monitored based on status reports received from the components, by scanning the distributed computing system (e.g., using SNMP), based on information gathered by a middleware service, a process monitor, etc. Monitoring the components may include monitoring transactions running on the components and/or including the components as participants.

At block 310, processing logic receives a request to initiate a new transaction. The request may be received from a client, from a service, or from another component. At block 315, processing logic identifies one or more components that will be used in the new transaction. This may include identifying software components (e.g., services) that will participate in the transaction, software components (e.g., operating systems, application servers, etc.) that interact with the participating software components, hardware components that host participating software components, and so on.

At block 320, processing logic determines whether a timeout period can be predicted. A timeout period can be predicted if a transaction completion time can be predicted for the new transaction within an acceptable level of accuracy (e.g., within two standard deviations, with 95% accuracy, with 99% accuracy, etc.). In one embodiment, such a determination is made by comparing properties of the new transaction and current load on software and hardware components that will be used for the transaction to a transaction model. Properties of the transaction may include services that will be participating, performance characteristics (e.g., processor speed, system memory, operating system, message transport, etc.) of software and/or hardware components that are used by the participating services, and so on. If the transaction model includes statistically significant data on the components and services, then a timeout period can be predicted, and the method continues to block 325. If the transaction model does not include enough information to predict a timeout period, the method proceeds to block 335.

At block 335, processing logic determines whether a timeout period has been specified for the transaction. If a timeout period has been specified, the method proceeds to block 345, and the new transaction is initiated with the specified timeout period. If no timeout period is specified, the method continues to block 340, and the new transaction is initiated using a default timeout period.

At block 325, processing logic dynamically determines a timeout period for the new transaction. The timeout period may be determined based on participants of the transaction, properties of software and hardware components, current load on the software and hardware components, etc. In one embodiment, the timeout period is determined by applying the information on participants, component properties and current load into a transaction model.

At block 330, the new transaction is initiated using the determined timeout period. The method then ends.

Figure 4:
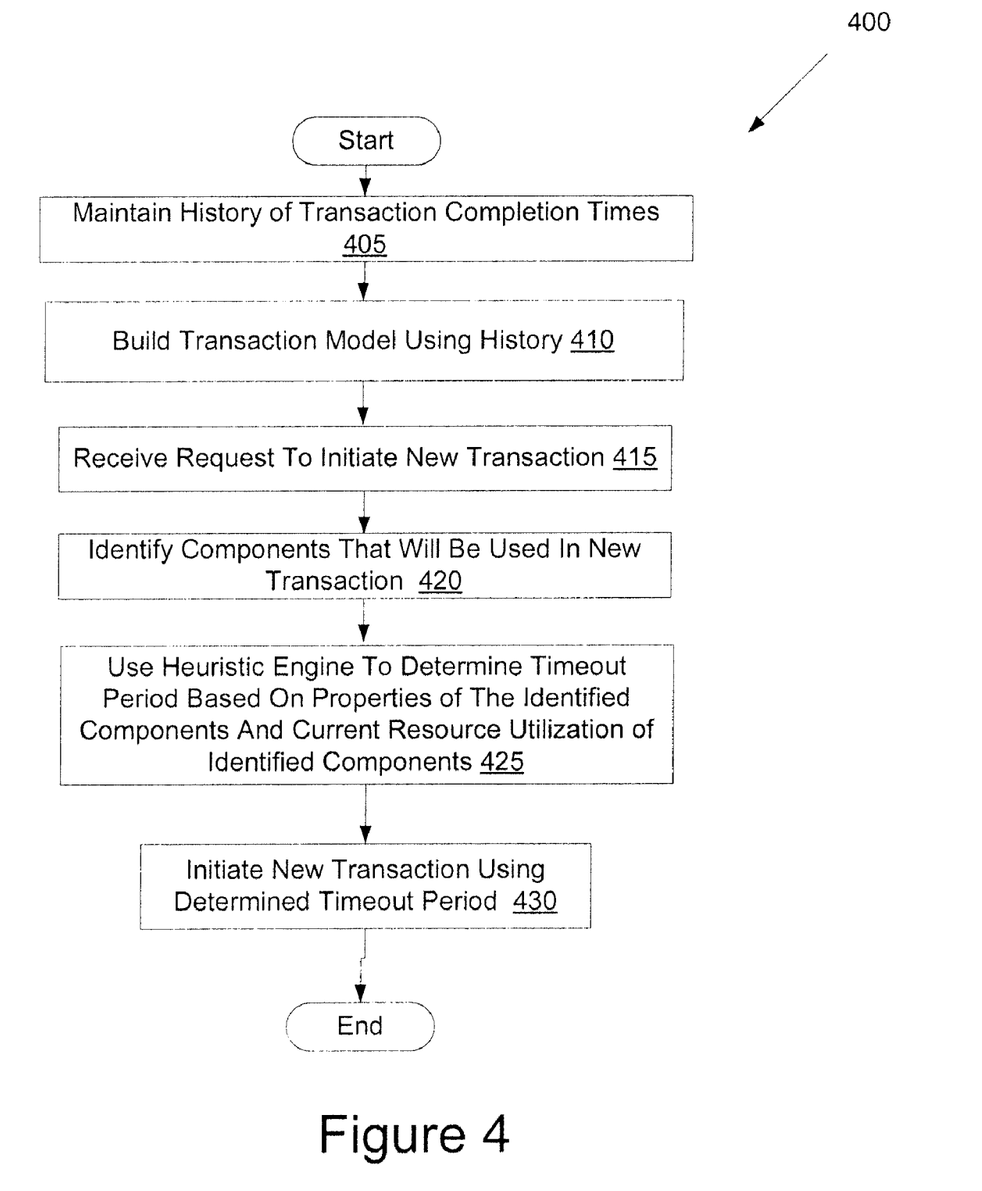
FIG. 4 illustrates a flow diagram of another embodiment for a method of dynamically determining a transaction timeout.

FIG. 4 illustrates a flow diagram of another embodiment for a method 400 of dynamically determining a transaction timeout. The method is performed by processing logic that comprises hardware (e.g., circuitry, dedicated logic, programmable logic, microcode, etc.), software (such as instructions run on a processing device), or a combination thereof. In one embodiment, method 400 is performed by transaction manager 115 and/or system manager 107 of distributed computing system 100 of FIG. 1.

Referring to FIG. 4, at block 405 processing logic maintains a history of transaction completion times. The history of transaction completion times may include information such as participants in past transactions, loads on components during the transactions, etc. At block 410, processing logic builds a transaction model using the history. The transaction model may include variables for one or more factors that can affect transaction completion time, such as participants, load on participants, proximity of participants to one another, data accessed by participants, etc.

At block 415, processing logic receives a request to initiate a new transaction. The request may be received from a service that will participate in the transaction, a client, or another component. At block 420, processing logic identifies one or more components that will be used in the new transaction. This may include identifying software components (e.g., services) that will participate in the transaction, software components (e.g., operating systems, application servers, etc.) that interact with the participating software components, hardware components that host participating software components, and so on.

At block 425, processing logic uses a heuristic engine to determine a timeout period based on properties of the identified components and current resource utilization of the identified components. The heuristic engine determines the timeout period by applying these variables into the transaction model that was built at block 410.

At block 430, the new transaction is initiated using the determined timeout period. The method then ends.

Figure 5:
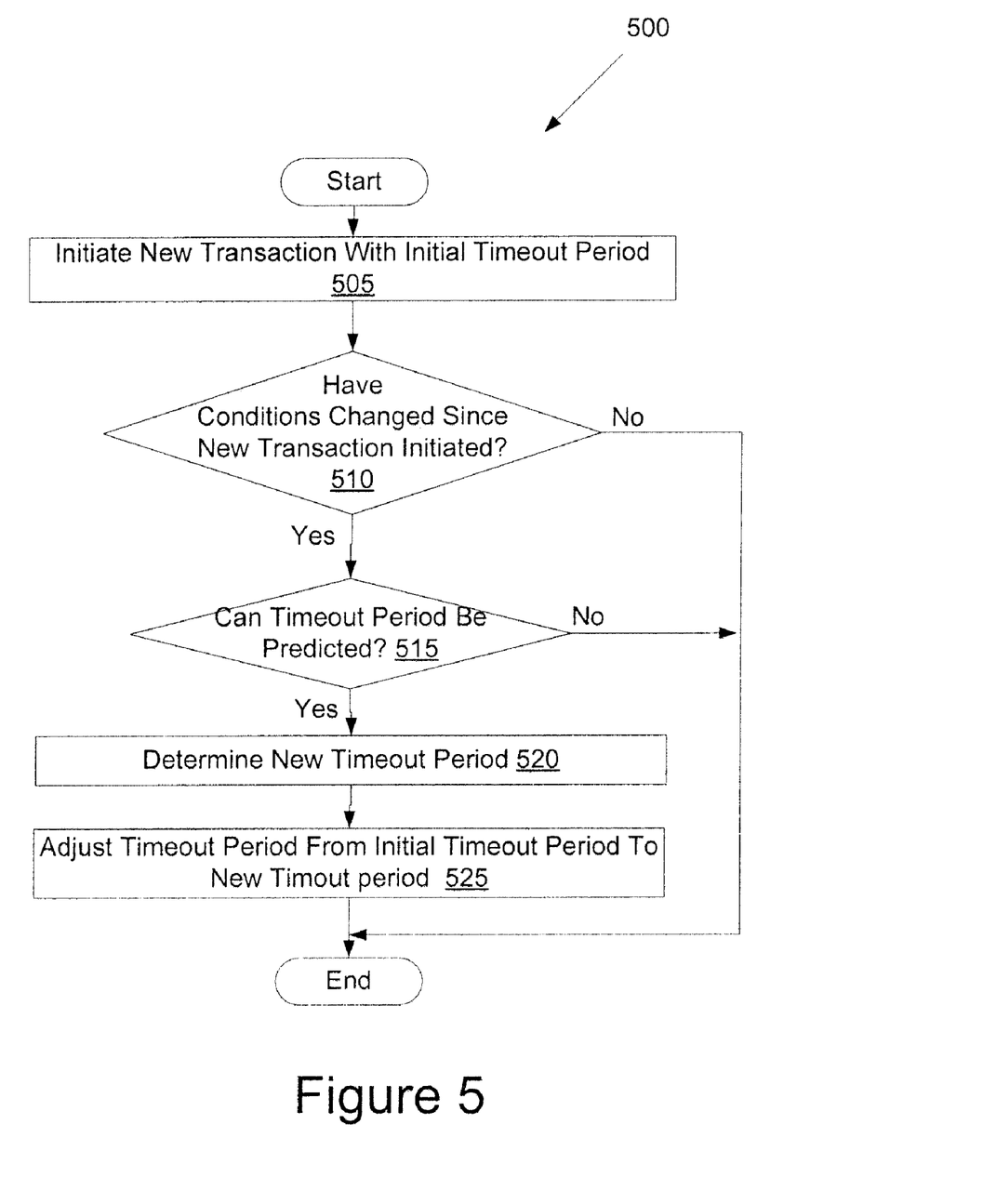
FIG. 5 illustrates a flow diagram of an embodiment for a method of dynamically modifying a transaction timeout for an in-process transaction.

FIG. 5 illustrates a flow diagram of one embodiment for a method 500 of dynamically modifying a transaction timeout for an in-process transaction. The method is performed by processing logic that comprises hardware (e.g., circuitry, dedicated logic, programmable logic, microcode, etc.), software (such as instructions run on a processing device), or a combination thereof. In one embodiment, method 500 is performed by transaction manager 115 and/or system manager 107 of distributed computing system 100 of FIG. 1.

Referring to FIG. 5, at block 505 processing logic initiates a new transaction with an initial timeout period. The initial timeout period may be a default timeout period, a specified timeout period, or a timeout period that was dynamically determined at the time that the new transaction is initiated. The new transaction includes one or more participants on a distributed computing system. The one or more participants may operate on one or more hardware components of the distributed computing system.

At the time that the new transaction is initiated, the distributed computing system has a first set of conditions. For example, participating hardware components may have had first load conditions, a network may have a first load condition, etc.

At block 510, processing logic determines whether conditions have changed since the new transaction was initiated. Changed conditions may include an increased or decreased load on one or more of the hardware components, software components, the network, etc. If the conditions have not changed, the method ends. If the conditions have changed, the method proceeds to block 515.

At block 515, processing logic determines whether a new timeout period can be accurately predicted. If a new timeout period cannot be accurately predicted, the method ends. If a new timeout period can be accurately predicted, the method continues to block 520, and the processing logic determines a new timeout period based on the changed conditions. At block 525, the timeout period is adjusted from the initial timeout period to the new timeout period. The method then ends.

Figure 6:
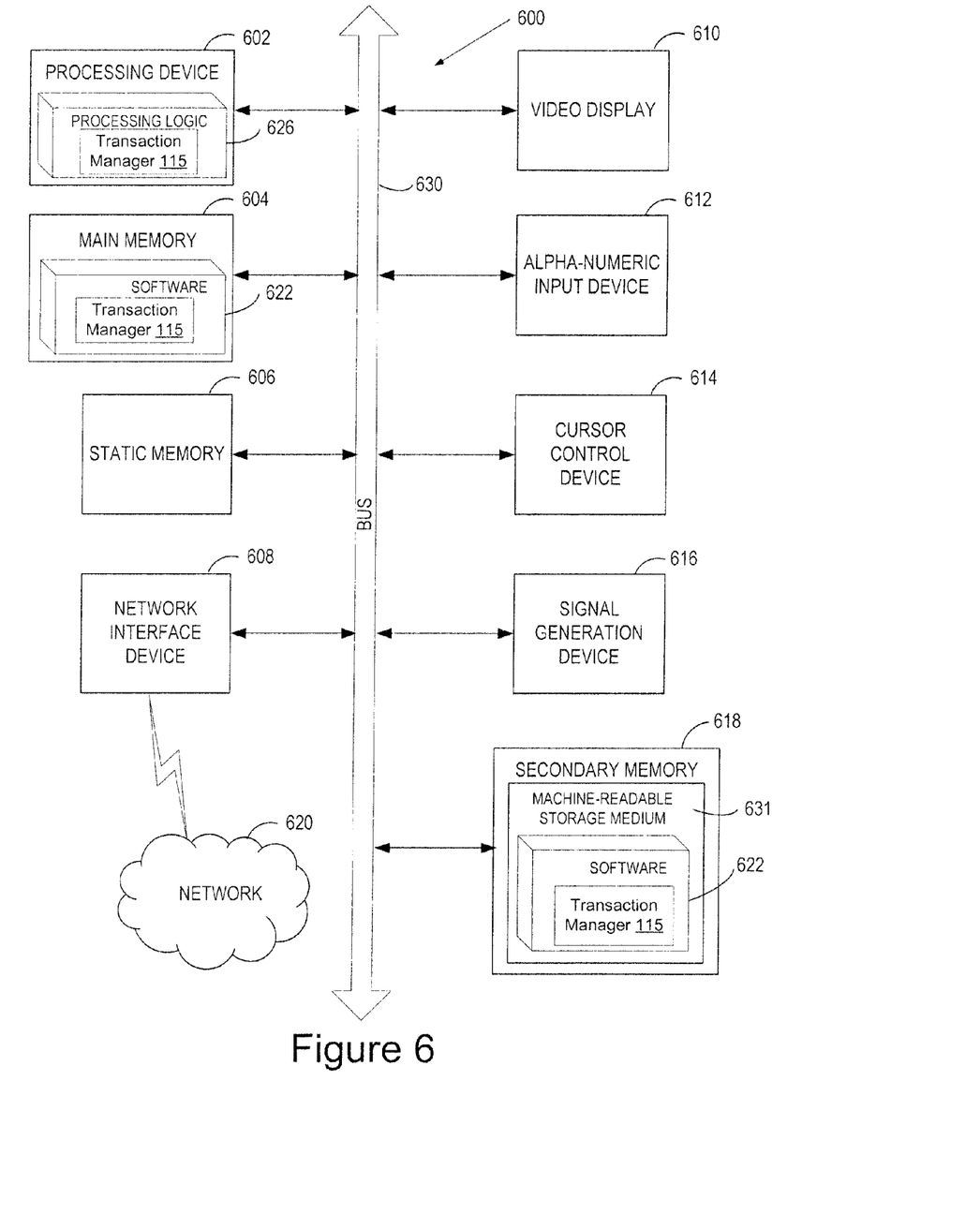
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store a transaction manager 115 of FIG. 1), and/or a software library containing methods that call a transaction manager 115. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device executing a transaction manager, a request to initiate a new transaction;
   identifying, by the processing device, one or more components of a distributed computing system that will be used by the new transaction, the one or more components comprising hardware components and software components that operate on the hardware components;
   determining, by the processing device, a timeout period to apply to the new transaction based on properties of the one or more components and a current resource utilization of the one or more components; and
   initiating, by the processing device, the new transaction, wherein the determined timeout period is assigned to the new transaction.

2. The method of claim 1, further comprising:
  detecting a change in the current resource utilization of the one or more components while the new transaction is pending; and
  adjusting the timeout period based on the detected change.

3. The method of claim 2, wherein adjusting the timeout period comprises:
  increasing the timeout period when the resource utilization on the one or more components increases; and
  decreasing the timeout period when the resource utilization on the one or more components decreases.

4. The method of claim 1, further comprising:
  when there is insufficient information to accurately determine a timeout period, applying a default timeout period.

5. The method of claim 1, further comprising:
  maintaining a history of transaction completion times for a plurality of transactions;
  building a transaction completion time model based on the history; and
  using a heuristic engine to determine the timeout period based on applying the properties of the one or more components and the current resource utilization of the one or more components to the model.

6. The method of claim 1, wherein applying the determined timeout period includes overriding at least one of a global default timeout period and a user assigned timeout period.

7. The method of claim 1, further comprising:
  monitoring the plurality of components of the distributed computing system by the server, wherein the monitoring includes tracking resource utilization of the plurality of components.

8. A non-transitory computer readable storage medium including instructions that, when executed by a processing device, cause the processing device to perform method comprising:
  receiving, by the processing device executing a transaction manager, a request to initiate a new transaction;
  identifying, by the processing device, one or more components of a distributed computing system that will be used by the new transaction, the one or more components including hardware components and software components that operate on the hardware components;
  determining a timeout period to apply to the new transaction based on properties of the one or more components and a current resource utilization of the one or more components; and
  initiating the new transaction, wherein the determined timeout period is assigned to the new transaction.

9. The non-transitory computer readable storage medium of claim 8, the method further comprising:
  detecting a change in the current resource utilization of the one or more components while the new transaction is pending; and
  adjusting the timeout period based on the detected change.

10. The non-transitory computer readable storage medium of claim 9, wherein adjusting the timeout period comprises:
  increasing the timeout period when the resource utilization on the one or more components increases; and
  decreasing the timeout period when the resource utilization on the one or more components decreases.

11. The non-transitory computer readable storage medium of claim 8, the method further comprising:
  when there is insufficient information to accurately determine a timeout period, applying a default timeout period.

12. The non-transitory computer readable storage medium of claim 8, the method further comprising:
  maintaining a history of transaction completion times for a plurality of transactions;
  building a transaction completion time model based on the history; and
  using a heuristic engine to determine the timeout period based on applying the properties of the one or more components and the current resource utilization of the one or more components to the model.

13. The non-transitory computer readable storage medium of claim 8, wherein applying the determined timeout period includes overriding at least one of a global default timeout period and a user assigned timeout period.

14. The non-transitory computer readable storage medium of claim 8, the method further comprising:
  monitoring the plurality of components of the distributed computing system by the server, wherein the monitoring includes tracking resource utilization of the plurality of components.

15. A computing apparatus comprising:
  a memory to store instructions for a transaction manager; and
  a processing device connected with the memory, the processing device to execute the instructions, wherein the instructions cause the processing device to:
    receive a request to initiate a new transaction;
    identify one or more components of a distributed computing system that will be used by the new transaction, the one or more components including hardware components and software components that operate on the hardware components;
    determine a timeout period to apply to the new transaction based on properties of the one or more components and a current resource utilization of the one or more components; and
    initiate the new transaction, wherein the determined timeout period is assigned to the new transaction.

16. The computing apparatus of claim 15, wherein the instructions further cause the processing device to:
  detect a change in the current resource utilization of the one or more components while the new transaction is pending; and
  adjust the timeout period based on the detected change.

17. The computing apparatus of claim 16, wherein adjusting the timeout period comprises:
  increasing the timeout period when the resource utilization on the one or more components increases; and
  decreasing the timeout period when the resource utilization on the one or more components decreases.

18. The computing apparatus of claim 15, wherein the instructions further to cause the processing device to:
  apply a default timeout period when there is insufficient information to accurately determine a timeout period.

19. The computing apparatus of claim 15, wherein the instructions further cause the processing device to:
  maintain a history of transaction completion times for a plurality of transactions;

build a transaction completion time model based on the history; and use a heuristic engine to determine the timeout period based on application of the properties of the one or more components and the current resource utilization of the one or more components to the model.

20. The computing apparatus of claim 15, wherein the instructions further cause the processing device to:

monitor the plurality of components of the distributed computing system, wherein the monitoring includes tracking resource utilization of the plurality of components.

* * * * *